United States Patent
Vriesema et al.

(10) Patent No.: US 8,419,820 B2
(45) Date of Patent: Apr. 16, 2013

(54) FAST DISSOLVING WATER-SOLUBLE FERTILIZER FORMULATIONS AND METHODS AND USES THEREOF

(75) Inventors: Hein Herman Vriesema, Bunde (NL); Johannes Gijsbertus Antonius Terlingen, Landgraaf (NL)

(73) Assignee: Everris International B.V., Heerlen (NL)

( * ) Notice: Subject to any disclaimer, the term of this patent is extended or adjusted under 35 U.S.C. 154(b) by 170 days.

(21) Appl. No.: 12/361,188

(22) Filed: Jan. 28, 2009

(65) Prior Publication Data

US 2010/0186471 A1 Jul. 29, 2010

(51) Int. Cl.
C05D 9/00 (2006.01)
C05D 9/02 (2006.01)
C05B 17/00 (2006.01)
C01C 1/18 (2006.01)
A01N 25/00 (2006.01)

(52) U.S. Cl.
USPC ....... 71/33; 71/31; 71/54; 71/64.01; 71/64.12

(58) Field of Classification Search ........ 71/1, 27–64.13
See application file for complete search history.

(56) References Cited

U.S. PATENT DOCUMENTS

| | | | |
|---|---|---|---|
| 3,585,020 A * | 6/1971 | Legal, Jr. | 71/29 |
| 4,175,943 A | 11/1979 | Jordaan et al. | |
| 5,286,272 A | 2/1994 | Biamonte et al. | |
| 6,200,928 B1 | 3/2001 | Kawai | |
| 6,241,795 B1 * | 6/2001 | Svec et al. | 71/11 |
| 6,312,493 B1 * | 11/2001 | Eltink et al. | 71/28 |
| 6,749,660 B2 | 6/2004 | Hince | |
| 6,826,866 B2 | 12/2004 | Moore et al. | |
| 6,866,780 B2 | 3/2005 | Yamada | |
| 2006/0243012 A1 | 11/2006 | Josef et al. | |
| 2009/0229331 A1 * | 9/2009 | Wells | 71/23 |
| 2010/0186471 A1 * | 7/2010 | Vriesema et al. | 71/28 |

FOREIGN PATENT DOCUMENTS

| | | |
|---|---|---|
| EP | 1 505 046 | 2/2005 |
| EP | 1 854 356 | 11/2007 |
| WO | WO 99/64372 | 12/1999 |
| WO | WO 2004/011394 | 2/2004 |

OTHER PUBLICATIONS

International Search Report and Written Opinion for International Application No. PCT/US 10/22219 mailed Mar. 5, 2010.
Supplementary European Search Report for European Application No. EP 10 73 6334, mailed May 31, 2012.

* cited by examiner

*Primary Examiner* — Stanley Silverman
*Assistant Examiner* — Jennifer Smith
(74) *Attorney, Agent, or Firm* — Hunton & Williams LLP

(57) ABSTRACT

Improved, solid water-soluble fertilizer (WSF) compositions are presented which comprise at least one acid (optionally nutritive) and at least one basic fertilizer component. In one or more embodiments of the present invention, the WSF compositions demonstrate improved solubility of one or more nutrients or additives in solution, do not require additional dissolution aids or anti-caking agents, demonstrate fast dissolution times, produce precipitate free solutions, are readily compounded without intermediate wetting or drying steps, do not generate gas, and demonstrate improved stability under typical usage conditions. Finally, the WSF compositions may be used in improved processes for the creation of stock solutions, optionally with cold water, and/or delivery of nutrients to plants.

29 Claims, 1 Drawing Sheet

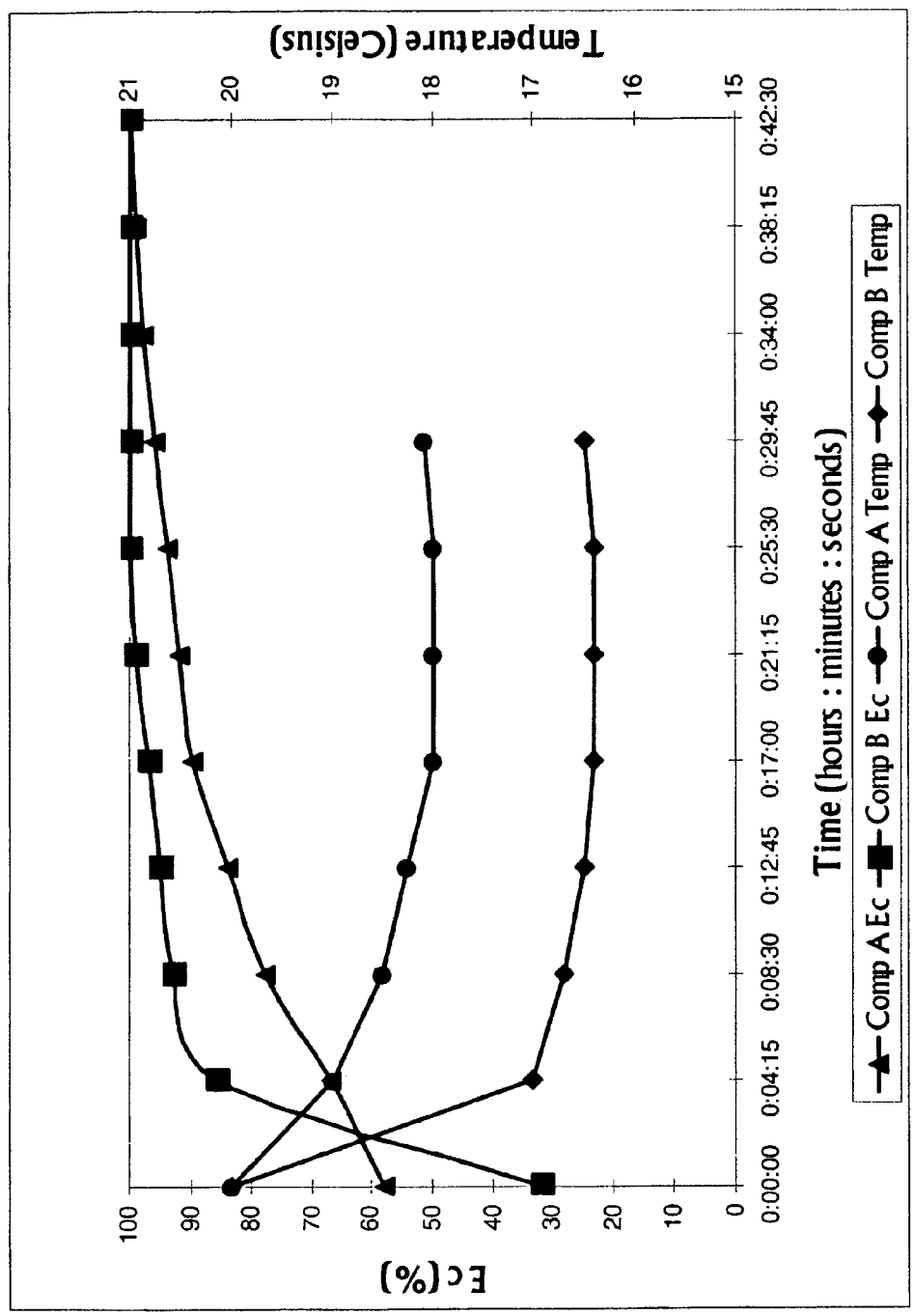

FAST DISSOLVING WATER-SOLUBLE FERTILIZER FORMULATIONS AND METHODS AND USES THEREOF

BACKGROUND OF THE INVENTION

1. Field of the Invention

One or more aspects of the present invention relate to improved water-soluble fertilizer ("WSF") compositions. More particularly, they relate to solid fertilizer compositions having rapid dissolution times and high water-solubility, wherein the WSF compositions also provide stable, precipitate free stock and feed solutions and excellent dry-storage characteristics. One or more aspects of the present invention also relate to methods of using improved WSF compositions.

2. Background and Description of Related Art

Carbon, hydrogen, oxygen, nitrogen phosphorus, potassium, and sulfur are the primary elements essential to all life. Soils contain all of these elements in addition to other macro and micronutrients which are needed for plant growth. Typically, such elements are not present in the soil in sufficient quantity or in forms that can support maximum plant growth and yield. In order to overcome these deficiencies, fertilizers having specific chemical constituents in specific amounts are often added to the soil, thereby enriching the growth medium. The fertilizers may be supplemented with certain trace elements such as copper, iron, manganese, zinc, cobalt, molybdenum (typically as a molybdate), and boron (typically as a borate), as oxides or salts.

Fertilizer compositions can be provided in many forms including dry granulated or free-flowing compositions intended. For dispersion or for dissolution in aqueous solution prior to delivery to plants or crops. Advantageous, dry fertilizer compositions provide for quick release (high water-solubility) when production of stock solution is desired. In other contexts, dry fertilizer compositions are advantageous when they provide for slow release (as by low water-solubility or by encapsulation), such as when the steady or controlled delivery of nutrients over time is desired.

In greenhouses, nurseries and other intensive horticulture environments, best plant growth results are achieved when macro and micro nutrients are carefully and thoroughly delivered to the growing plants. Many plant and agricultural growers choose to utilize water-soluble fertilizers for accomplishing this result. Typically, such fertilizers are formulated as solids which may be dissolved by the user to prepare concentrated stock solutions which are subsequently diluted into irrigation water employing proportioners or injection devices, thereby forming so called "feed solutions."

Agricultural fertilizers usually contain a select number of macronutrients. Agricultural fertilizers are typically intended to be applied infrequently and normally prior to or alongside seeding. Examples of agricultural fertilizers are granular triple superphosphate, potassium chloride, urea, ammonium sulfate, and anhydrous ammonia. By comparison, horticultural or specialty fertilizers, on the other hand, are formulated from many of the same compounds as agricultural fertilizers and some others to produce well-balanced fertilizers that also contain micronutrients.

Typical dry WSF compositions are made by mixing different nutrient containing powders and/or granules. In general the pH of the final solution sprayed or applied by irrigation is around 6-6.5. For soft water like most rain water, the WSF composition should yield a pH of close to the desired pH after dissolution and dilution. For hard water, the WSF compositions tend to be more acidic to neutralize the higher pH of the water. Therefor for soft water and general purpose products, the ingredients consist from a group of 'neutral' nutrients. These ingredients give a close to neutral pH in a concentration range from about 1-10%. For hard water products, an acidic component like urea phosphate may be added.

It is important to formulate these high analysis fertilizer compositions so that they dissolve quickly and completely with no precipitation. Solubilities of about 200 grams/L are considered high and are advantageous. Furthermore, these fertilizer compositions must provide good long-term stability in both dry-form and in stock solutions. For example, compositions which cake, crust, agglomerate, or decompose decrease the suitability of the fertilizer composition.

A drawback of many prior art "water-soluble" fertilizers is that they tend to "cake." Caking interferes with their handling in bulk by the producer and by the end user and may interfere with the speed of dissolution of the fertilizer in water. Fertilizer caking is believed to be caused by several factors, e.g., the formation of crystalline bridges to which solid connections are formed at the points of contact among the granules. Alternatively, there may be capillary adhesion or bonding between the granules with significant force often being necessary to break this adhesion or bonding. The cohesive forces will vary depending upon the storage conditions and other variables such as the nature of the composition. The hygroscopic nature of many fertilizers may also results in undesirable caking. Further, hygroscopic compounds provide a medium—via absorption of water—whereby undesirable chemical reactions may occur. In all cases, however, the caking causes a serious problem to which a completely satisfactory solution has long been lacking. Additives are often added to attempt to inhibit caking. For example, U.S. Pat. No. 5,286,272 describes an inorganic fertilizer composition that flows freely and resists caking comprising a beneficial agent and a separate anti-caking agent (tripotassium phosphate).

Other prior art methods proposing to decrease fertilizer caking also involve the use of additives to the fertilizer composition. Typical additives include the use of finely divided powders which must cover the fertilizer substantially uniformly such as for example talc, kaolin and diatomaceous earth. Surfactants may also be used. Further additives include compounds that also tend to form a hydrophobic film around the fertilizer granules such as paraffin wax, polyolefin wax and mineral oils. These formulations, which may demonstrate some improved storage characteristics, are often not suitable for the preparation of stock or feed solutions because they may result in suspensions in solution containing these agents. Undissolved particulates can result in undesired clogging of the feed line, proportioner, or sprayer.

Accordingly, advantageous WSF compositions should be readily soluble in aqueous solutions, providing a completely substantially completely dissolved solution shortly after mixing, thereby allowing prompt use of the stock or feed solution. Again, once dissolved in solution, precipitates (or non-dissolved compounds) in the stock solutions can cause clogging of the proportioners and irrigation lines. Therefore, WSF compositions should also remain dissolved once in solution at varying concentrations (from concentrated such as in a stock solution to dilute such as in a feed solution). Further, water-soluble fertilizer compositions which release non-trivial amounts of gas are usually not suitable for use in tanks, containers, on large agricultural scales, or for use in sprayers, drippers, and irrigation lines. Accordingly, water-soluble fertilizer compositions should not release significant gases during dissolution: preferably, they should release close to none.

An additional functional requirement for advantageous fertilizer compositions is the ability to store large amounts of fertilizer in containers such as bags without decomposition or the production of gas. Also, formulations which can be manufactured by simply mixing one or more of the ingredients without intermediate wetting or drying stages are also idea.

These functional requirements for water-soluble fertilizer compositions of this variety have presented ongoing problems for producers and developers of such products and these problems have not been fully solved by previously available fertilizer compositions. Most prior art references attempt to address this issue via modifications of the proportioners or sprayer. For example, U.S. Pat. No. 6,866,780 describes a heated ultrasonic treating device comprising a sump through which suspended matter-containing liquid passes, a temperature-controllable heater and a ultrasonic vibrator disposed in the sump which function to "pulverize" the suspended matter upon heating/vibration. Other attempted solutions include U.S. Pat. No. 6,200,928, which describes "effervescent preparations" for plants comprising generally non-nutritive carbonates, non-nutritive water-soluble acids, and various nutrients such as methionine. A distinct disadvantage of effervescent compositions is that while production of gas and the resulting agitation increase dissolution speed, they also create a hazard when used in closed or unvented containers. Additionally, there are limited numbers of nutritive carbonate or gas producing fertilizers suitable for creation of effervescent formulations and non-nutritive carbonate sources effectively dilute the nutritive content of the composition.

U.S. Pat. No. 6,312,493 describes water-soluble fertilizer compositions containing phosphate free organic acids to aid solubility and one or more fertilizer components. Another soluble fertilizer composition is described in U.S. Pat. App. No. 2006/0243012. The soluble fertilizer composition comprises calcium and/or magnesium phosphates. In attempting to overcome the poor physical properties of monobasic calcium phosphate (MCP) and monobasic magnesium phosphate (MMgP) fertilizers (slight solubility in water), the inventors modify these compounds by chemical reaction to provide fertilizer formulations comprising 1) calcium phosphate or magnesium phosphate; 2) at least one alkali metal phosphate such as monopotassium phosphate; and 3) phosphoric acid (PA). In formulating these compositions, certain embodiments describe the mixing of phosphoric acid, monopotassium phosphate, and various alkali hydroxides in water; reaction of the components; and subsequent drying to form a final composition having an acidic pH. Improved solubility is obtained by modification of the initial chemical constituents into compounds with improved solubility characteristics.

Another exemplary soluble fertilizer composition which attempts to provide improved solubility characteristics is U.S. Pat. No. 6,826,866. This patent describes the use of dilute, aqueous water-soluble fertilizer compositions containing a surfactant system comprising water-soluble nonionic surfactant and alkyl polyglycoside in a weight ratio of from 2:1 to 1:1.

A classical water-soluble fertilizer composition is described in U.S. Pat. No. 4,175,943 where a water-soluble mixed fertilizer composition in solid form and a method of producing the fertilizer composition is described. The fertilizer comprises a mixture of urea, phosphoric acid and at least one potassium salt selected from the class comprising potassium sulfate, potassium nitrate and potassium chloride. Ammonium salts selected from the class comprising ammonium nitrate and ammonium sulfate may optionally also be added to the mixtures.

Other typical prior art formulations which intend to improve the solubility of certain compounds, such as trace metals, may also utilize either chelating agents or adjustment of the final composition to an acidic pH when in solution.

The above prior art formulations suffer from one or more disadvantageous properties including: (1) poor solubility of one or more nutrients or additives in solution; (2) the need for undesirable additives to aid dissolution or to impart anti-caking properties; (3) slow dissolution times; (4) precipitation of nutrients or additives from solution (resulting in clogging or other malfunction of, for example, a nutrient proportioner); (5) prolonged, difficult, or expensive compounding steps; (6) evolution of gas; and/or (7) chemical safety and stability issues including decomposition of the dry or dissolved fertilizer mixture. Accordingly, there has been a long-felt need for compositions which remedy the deficiencies of prior fertilizer compositions.

SUMMARY OF THE INVENTION

In view of the long felt need of horticultural growers and agriculturists to have effective fertilizer compositions which do not suffer from one or more of the above disadvantages, it is one object of the present invention to provide nutrients for plants in a fertilizer composition that renders these nutrients readily available to the plants through irrigation, drip line, spray or other delivery systems in which a dry solid fertilizer is diluted with water and fed to a plant. For example, in one or more embodiments, at least one acid (optionally a fertilizer) which is solid at ambient temperature and at least one base (optionally a weak base and preferably a fertilizer and also solid at ambient temperature) produce a combined composition which is stable in dry form, substantially non-effervescent upon dispersion of, for example, 1, 10, 50, 100, or more grams of the composition in 1000 grams of water at room temperature, and essentially precipitate-free upon complete dissolution of, for example, 1, 10, 50, 100, or more grains of the composition in 1000 grams of water at room temperature. The acid and base components are most preferably each present in at least 5% by weight of the total composition and react in aqueous solution to generate an exotherm which, at least in part, aids in the dissolution speed of the components. It is noted that in alternative embodiments, the acid may be a weak acid and the base is not a weak base. In additional embodiments, both the acid and the base are weak.

It is a further object of the present invention to provide fertilizer compositions in which the nutrients present do not precipitate. It is yet another object of the present invention to provide dry fertilizer compositions which are stable under normal use and storage conditions. It is also an object of the present invention to provide fertilizer compositions which are quickly and readily soluble in water. One or more of the foregoing objects and other objects of the invention are surprisingly achieved by providing a solid fertilizer composition comprising at least one acidic (optionally nutritive) component and at least one basic fertilizer component.

Unexpectedly, the inventors have discovered that despite the well-known reactivity of acids with bases, even when combined in their dry form, and the undesirable hygroscopic effect of many acid or base compounds, WSF compositions comprising both acids and bases can be made. In particular, the inventors have discovered dry, highly water-soluble fertilizer compositions comprising both acidic and basic fertilizer components which synergistically provide improved dissolution and storage characteristics. In one or more aspects of the invention, the compositions comprise acids (or strong acids) and weak bases. In other aspects of the invention, the compositions comprise bases (or strong bases) and weak acids.

More specifically, fertilizer compositions in accordance with the present invention are water-soluble, solid compositions containing, for example, urea phosphate as a solid acidic fertilizer in combination with a basic fertilizer component such as tetrapotassium pyrophosphate (TKPP), optionally and preferably in combination with one or more neutral fertilizer components such as ammonium nitrate. Most preferably, the basic fertilizer component (when balanced with an acid) is a weakly basic fertilizer. In some alternative embodiments, the composition may comprise a basic fertilizer and is therefore matched with a weakly acidic fertilizer. Some suitable fertilizer materials for inclusion in the fertilizer compositions include primary macro nutrients, secondary nutrients, micro nutrients and mixtures thereof. The primary macro nutrients include phosphorus, nitrogen and potassium containing macro nutrients. Preferably, phosphorus containing macro nutrients are present in the form of phosphates. Exemplary of some of the advantages resulting from use of the fertilizer compositions of the present invention are the following:

(1) The ability to prepare and apply a complete nutrient solution with only one stock solution, made from a fertilizer composition of the present invention, and one proportioner.
(2) The ability to rapidly dissolve fertilizer compositions without evolution of gas, in water of varying temperatures (including cold water) and to improve the overall water solubility of fertilizer compositions.
(3) Solid acid or acidic fertilizer (and solid base or basic fertilizer) containing fertilizer compositions are significantly less hazardous to the end user than liquid fertilizer compositions based on, e.g., phosphorus containing acids or aqueous solutions comprising potassium hydroxide.
(4) The ability to rapidly prepare precipitate free feed solutions from stock solutions made from the fertilizer composition of the present invention and water of varying alkalinity, hardness, or softness.
(5) The ability to store the dry fertilizer mixture over extended periods of time under typical conditions without significant decomposition, caking, or hazard.
(6) The ability to readily and rapidly compound formulations of one or more embodiments of the present invention without intermediate dissolution and drying steps.

Certain terms of art are used in the specification. They are to be accorded their generally accepted meaning within the relevant art; in particular, the following well-understood terms are hereby more fully described. It is to be noted that pH is determined by measuring a room temperature aqueous (distilled water) solution comprising 1% (w/w) of the reference component(s) unless otherwise stated.

The following values in Table 1 describe the pH ranges for different compositions and/or components.

TABLE 1

| pH RANGE | |
|---|---|
| FERTILIZER COMPOSITION | |
| Acidic | <4.5 |
| Weakly Acidic | 3.0-<4.5 |
| Neutral | >4.5 but <10 |
| Weakly Basic | >10 but <12.5 |
| Basic | >10 |
| COMPONENT | |
| Acidic | <4.5 |
| Weakly Acidic | 3.0-<4.5 |
| Neutral | >4.5 but <10 |
| Weakly Basic | >10 but <12.5 |
| Basic | >10 |

A compound which has a solubility of at least 200 grams/L in water at room temperature is understood to be highly water-soluble; whereas a compound which has a solubility of 100 to 200 grams/L in water at room temperature is moderately water-soluble, and a compound which has a solubility of 10-100 grams/L in water in room temperature is generally considered water-soluble; and a compound which has a solubility of less than 10 gram is sparingly water-soluble.

Most dry fertilizers are understood to be (1) particulate flowing solids, (2) powders, (3) granulated compositions, (4) matrixes, or other (5) solid or substantially solid masses comprising one or more ingredients having a free water content of less than about 10% by weight of the total composition. Hydrates are not considered free water. Fertilizers are understood as compositions which provide one or more ingredients which alone or in combination with other ingredients present in the composition provide nutrients and/or act as a food for plants.

The terms "room temperature" and "ambient temperature" are equivalent and indicate a standard operating temperature. Room temperature and ambient temperature are both between 20 to 25 degrees Celsius. Some typical room temperatures or ambient temperatures include 20, 20.5, 21, 21.5, 22, 22.5, 23, and 23.5, 24, 24.5, and 25 degrees Celsius. Preferably, these temperatures are taken to be 20 degrees Celsius unless otherwise defined. Cold water is water at a temperature of less than 20 degrees Celsius unless otherwise defined. Concentrations in percentage terms are by weight unless otherwise defined. Relative humidity is 60% unless otherwise defined and atmospheric pressures are used unless otherwise defined.

In the water-soluble fertilizers of the present invention, the WSF composition comprises at least one acid and at least one base, wherein both are solid at ambient temperatures. The at least one acid is optionally a fertilizer. The at least one base comprises at least one fertilizer. In reporting percentages of nutrients, the percentage is with respect to the total weight of the WSF composition. Likewise, in reporting amounts of acids or bases, percentages are with respect to the total weight of the WSF composition. In reporting a percentage of a component, such as an acidic component, a basic component, or a neutral component, percentages are with respect to the proportion of that specified component with respect to the total weight of the WSF composition. Further, basic, acidic, or neutral fertilizer components are species of basic, acidic, or neutral components. Accordingly, reference to a "basic component," for example, does not necessarily exclude part or all of that component from functioning as a fertilizer. Unless specifically excluded, an acidic, basic, or neutral component may comprise any proportion of fertilizer acting as an acidic, basic, or neutral component.

A composition is non-effervescent upon dispersion in water, when upon dissolution there is (a) no observable fizzing, foaming, bumping, or, production of bubbles (b) that reach the surface (c) that are the result of a chemical reaction (d) between two components in the composition. The release of gases trapped in a dry composition or the release of gases introduced because of agitation are not considered effervescence. Further, the release of gases already present in the water or the decomposition of a compound trapped in the water (such as carbonic acid), whether caused by a chemical or physical reaction with the composition or not, does not render the composition effervescent.

It is to be noted that there is a distinction between an effervescent composition and the observance of effervescence. A composition is only effervescent if the chemical reaction of only its components and water upon dissolution results in the production of bubbles reaching the water-air interface under room temperature and atmospheric pressure. A composition is substantially non-effervescent when less than 0.5% of the composition liberates gas upon reaction with a proton source or a Lewis acid in water. A typical proton source is the hydronium ion ($H_3O^+$) and a typical Lewis acid is $PCl_5$ or $H^+$.

Finally, it is to be recognized that a fertilizer composition according to one or more embodiments of the present invention may, upon dissolution in an aqueous solution at room temperature, result in an acidic, basic or neutral solution. Said fertilizer composition—whether producing an acidic, basic, or neutral solution—may comprise one or more acidic, one or more basic, or one or more neutral components.

BRIEF DESCRIPTION OF THE FIGURES

FIG. 1 illustrates the change of solution temperature and conductivity over time after dissolution of one embodiment of the water-soluble fertilizers of the present invention and a reference fertilizer composition.

DETAILED DESCRIPTION OF THE PREFERRED EMBODIMENTS

The invention provides, in one or more embodiments, a water-soluble, solid fertilizer composition comprising one or more acidic fertilizer components such as the acid urea phosphate, said acid being solid at ambient temperature, and one or more basic fertilizer components such as tripotassium phosphate. Optionally, the composition further includes one or more neutral fertilizer components such as ammonium nitrate. Additional fertilizer materials include primary macro nutrients, secondary nutrients and/or micro nutrients.

Fertilizer compositions of one or more embodiments of the invention may be formulated by mixing of one or more constituents of the fertilizer. Said compositions may then be bagged or stock solutions prepared by addition of water.

The fertilizer compositions of one or more embodiments of the invention are dry, solid materials. They are particulate, flowing solids having a free water content of less than about 10% by weight of the total composition and may contain other additives to condition the fertilizer depending on need. A free water content of less than 5% is preferred, and a free water content of 0 to 1% is highly preferred. The present invention may comprise compositions or articles having (a) acids and weak bases; or (b) bases and weak acids. When a weak base is paired with an acid, the acid may be merely acidic or strongly acidic. Likewise, when a weak acid is paired with a base, the base may be merely basic or strongly basic.

In preferred embodiments of the invention, the water-soluble fertilizer composition will exhibit a pH of 2.0, 2.1, 2.2, 2.3, 2.4, 2.5, 2.6, 2.7, 2.8, 2.9, 3.0 or greater upon dissolution of one or more grams in 1000 grams of water at room temperature. More preferably, the WSF composition exhibits a pH of 3.1, 3.2, 3.3, 3.4, 3.5, 3.6, 3.7, 3.8, 3.9, 4.0 or greater upon dissolution of one or more grams in 1000 grams of water at room temperature. Most preferably, the WSF composition exhibits a neutral pH upon dissolution of one or more grams in 1000 grams of water at room temperature. In other preferred embodiments, the WSF composition exhibits a neutral pH upon dissolution of 1-100 grams, 1-10 grams, 5 grams, or 10 grams in 1000 grams of water at room temperature.

In one aspect of the invention, the basic components of the composition, at least some of which are fertilizers, are present in some percentage X and the acid components, some of which may be fertilizers, are present in some percentage Y, wherein the sum of X and Y is at least 10% and no more than 100%. Exemplary individual values of X and Y may be 0, 1, 2, 5, 10, 15, 20, 25, 30, 35, 40, 45, 50, 55, 60, 65, 70, 75, 80, 85, 90, 95, 98, 99, and 100. Preferably, the individual values of X and Y are each greater than 5 and less than 100.

In one or more embodiments of the present invention, the fertilizer compositions comprise one or more ingredients including acidic compounds, neutral compounds, and/or basic compounds. These compounds may, among other things, function solely or in combination as pH regulators, pH adjusters, reactants, buffers, fertilizers, fillers, stabilizers, caking inhibitors, solubility aids, and/or conditioners. For example, one or more solid acidic components include malonic acid (dicarboxylic acid), DL-malic acid ((±)-2-hydroxysuccinic acid), maleic acid (cis-butenedioic acid), succinic acid (butane dioic acid), itaconic acid (methylenesuccinic acid), glutaric acid (1,5-pentanedioic acid), glycolic acid (hydroxyacetic acid), tricarballylic acid (1,2,3-propanetricarboxylic acid), adipic acid (hexanedioic acid), pimelic acid (heptanedioic acid), citric acid (2-hydroxy-1,2,3-propanetricarboxylic acid), maleic anhydride (2,5-furanedione) and/or succinic anhydride.

Examples of solid basic components include the various carbonates of potassium, sodium, and magnesium, metal oxides such as magnesium oxide, various hydroxides such as potassium hydroxide, and organic bases. However, those carbonates or other species which are subject to decomposition in aqueous solution or reaction with acid to form gases, such as carbon dioxide, are not preferred. Accordingly, it is preferred that nutritive bases are used which cause little to no effervescence as compounded when placed into solution. The conjugate bases of various inorganic and organic acids may also be used including tetrapotassium pyrophosphate, tripotassium phosphate, or sodium citrate (otherwise known as trisodium citrate). Preferably, in one embodiment, the basic components are weakly basic. In another embodiment, the acidic components are weakly acidic. Addition of strong bases such as KOH (when a strong acid is used) is not preferred.

Advantageously, strong acid/strong base mixtures comprising significant strong acid and strong base components are avoided unless these components are maintained separate or demonstrate reduced activity with respect to each other. In most embodiments, it is highly preferred that the corresponding acidic and basic fertilizer components comprise a significant nutrient source. For example, preferred compositions comprise about at least 5% or more by weight of a basic component providing a nutrient source and about at least 5% or more of an acidic component which optionally provides a nutrient source. Accordingly, compositions in one or more embodiments of the present invention, comprise at least 5% of an acid (which may or may not be a fertilizer) and at least 5% of a base (of which there exists at least 5% basic fertilizer with respect to the total composition).

Components which release gas upon neutralization or other reaction upon addition to water are not preferred. Effervescence or the production of gas is not desirable in water-soluble fertilizer compositions because of, for example, the potential for dangerous build-up of gas. Accordingly, in one or more aspects of the present invention, the water-soluble fertilizer composition does not effervesce or release gas in more than trivial amounts. In highly preferred embodiments, the composition does not effervesce or release gas in any observable amount.

Table 2 illustrates some common acidic, basic, and neutral fertilizer components and their solubilities which may be used to formulate the compositions of one or more embodiments of the present invention.

TABLE 2

| COMPOUND NAME | SOLUBILITY* | pH** |
|---|---|---|
| Urea Phosphate (UP) | 96 | 2 |
| PeKacid ($KH_5(PO_4)_2$) | 67 | 2.2 |
| Citric Acid | 133 | 2.3 |
| Monoammonium Phosphate (MAP) | 40 | 4.5 |
| Monopotassium Phosphate (MKP) | 25 | 4.5 |
| Potassium Sulfate | 12 | 4.9 |
| Ammonium Sulfate (AS) | 76 | 5 |
| Magnesium Nitrate | 71 | 5.4 |
| Potassium Chloride (KCl) | 35 | 5.9 |
| Calcium Ammonium Nitrate | — | 6 |
| Ammonium Nitrate (AN) | 213 | 6 |
| Urea | 108 | 7 |
| Potassium Nitrate ($KNO_3$) | 38 | 9.4 |
| Dipotassium Phosphate (DKP) | 168 | 9.8 |
| Tetrapotassium pyrophosphate (TKPP) | 187 | 10.8 |
| Tripotassium Phosphate (TKP) | 106 | 12 |
| Potassium Hydroxide (KOH) | 121 | 12.9 |

*Solubility (grams) in 100 grams water at room temperature (~20-~25° C.)
**pH of a 1% solution in water at room temperature The acid component of the composition is preferably present in an amount of about 3 to about 90%, and more preferably about 5 to about 60%, by weight of the composition. The amount of solid acid to be added depends on a number of factors including (1) the hardness and/or alkalinity of the water to be applied; (2) the amount of phosphates in the product; (3) the basifying effect of the basic components; and (4) the acidifying effect of the solid acid. Likewise, the same considerations are useful in determining the amount of solid base to be added. The formulations of the present invention may, in one or more embodiments, be adapted for dissolution in water of varying types of hardness according to methods known in the art. See, e.g., U.S. Pat. No. 6,312,493.

With regard to the primary macro nutrients for use in the compositions of this invention, they include phosphorus, nitrogen and/or potassium containing macro nutrients.

Preferred nitrogen containing macro nutrients include nitrates, ammonium salts and urea derivatives. Preferred potassium containing macro nutrients include potassium salts. Preferred phosphorous containing macro nutrients include phosphates. The primary macro nutrients are preferably present in the composition and more preferably are within 1 to 99% by weight of the composition.

The preferred secondary nutrients for use in the compositions of the present invention include non-chelated elements consisting of calcium, magnesium and sulfate salts. The secondary nutrients are preferably present in the composition in an amount of about 0 to about 99% by weight of the composition and more preferably are present from about 0.1% to 99% by weight. It is to be noted that macronutrients (and micronutrients) are optional. These components may already be present in solution or simply may not be needed. When trace elements are added, it is preferred that they are chelated.

Preferred micro nutrients for use in the compositions include the elements consisting of iron, molybdenum, manganese, copper, zinc and cobalt sulfates and nitrates, boric acid, borates and molybdates. These elements may be present in chelated form. The micro nutrients are preferably present in the compositions in an amount of about 0 to about 50% by weight of the composition and more preferably from about 0.1% to about 50% by weight.

According to one embodiment of this invention, the fertilizer composition comprises about 1 to about 99% and, preferably, about 5 to about 60% of one or more acid components which optionally are fertilizers. The remainder of the composition comprises at least one or more basic components, wherein at least one component is a basic fertilizer. The basic fertilizer components comprise at least 5% of the composition in preferred embodiments.

According to another embodiment of this invention, the fertilizer composition contains about 1 to about 99% and, preferably, about 5 to about 60% of one or more basic components wherein at least one component is a basic fertilizer component and the remainder of the composition comprises at least one acidic component which optionally may be a fertilizer. The acidic component or components comprise at least 5% of the composition in preferred embodiments.

According to another embodiment, the fertilizer composition of the present invention contain about 1 to about 99% and, preferably, about 5 to about 60% of an acid or acids (such as citric acid) or acid fertilizer(s) (such as urea phosphate); and about 1 to about 99% and, preferably, about 5 to about 40% TKP and/or TKPP.

Because carbonates such as, e.g., potassium carbonate are subject to effervesce upon reaction with an acid, basic fertilizer materials which produce free carbonate in solution are not preferred. Accordingly, in one or more preferred embodiments, the fertilizer composition is a mixture of an acidic and a basic compound wherein the basic compound is not a carbonate. A carbonate is understood to be any compound containing the carbonate group which produces free carbonate upon dissolution in water. Free carbonate is carbonate which reacts with a proton source, such as citric acid in water, to produce carbon dioxide. Other compounds which undergo reaction with a proton source in water to produce carbon dioxide or any other gas are also not preferred.

In one or more embodiments of the invention, the composition is formulated to dissolve without the production of stoichiometric or supra-stoichiometric amounts of gas relative to the acid, base, and/or neutral components and preferably produces sub-stoichiometric amounts of gases. Most preferably, for each mole of acid, base, and/or neutral component less than 0.1 moles of gas are produced, and most preferably less than 0.01 moles of gas are produced. For example, a compound containing one mole of an acid, one mole of a base, and one mole of a neutral compound, produces preferably less than 0.01 moles of gas with respect to each mole of acid, base, or neutral compound, i.e. less than 0.03 moles of gas are produced in total upon complete dissolution.

In additional embodiments, the composition is formulated to produce a colorless or clear solution upon complete dissolution in water. Complete dissolution occurs when agitation results in no additional dissolution of the composition at room temperature, i.e. no more composition will dissolve in solution. The composition may also be described as being free of haze, cloudless or free of cloudiness, or non-turbid. In other embodiments, the solution may be clear but exhibit a color. The color may be the result of, e.g., the inclusion of a dye in the composition. In one or more embodiments of the invention, a 10% solution of the composition is clear at temperatures as low as 0.1, 5, 10, 15, or 20° C. A clear solution is one which upon vigorous agitation exhibits no visible suspended particulates upon observation by the human eye. Such "clear" solutions may also be described as substantially or essentially free of suspended particulates.

In yet another embodiment of this invention, the fertilizer composition does not include any phosphorus containing macro nutrients therein. For example, an organic or inorganic acid such as citric acid may be added in combination with a weakly or strongly basic fertilizer component with or without the addition of neutral fertilizer components.

Examples of phosphorus, nitrogen and potassium containing macro nutrients to be included in the fertilizer composition of the present invention are ammonium nitrate, urea, urea phosphate, ammonium sulfate, sodium nitrate, mono-ammonium phosphate, di-ammonium phosphate, mono-potassium phosphate, di-potassium phosphate, tri-potassium phosphate, potassium nitrate, potassium sulfate, tetrapotassium pyrophosphate, potassium chloride, magnesium nitrate, calcium nitrate and/or the like.

The range of fertilizer compositions falling within the scope of the present invention are those having a phosphorus content (as wt. % $P_2O_5$) of from about 0 to about 60%, nitrogen content (as wt. % N) of from about 0 to about 46% and potassium content (as wt. % $K_2O$) of from about 0 to about 60%.

In addition to phosphorus, nitrogen and potassium containing primary macro nutrients, elements such as calcium and magnesium, sulfur as sulfates (i.e., secondary nutrients) and iron, manganese, copper, boron, zinc, molybdenum and cobalt (i.e., micro nutrients) can be included in the fertilizer composition of the present invention as other fertilizer materials. These elements may in practice for example be included in the concentration ranges listed in the Table 3.

TABLE 3

| NUTRIENT | CONCENTRATION RANGE IN FINAL NUTRIENT DRY PRODUCT (WT. %) |
|---|---|
| Ca | 0-15 |
| Mg | 0-5 |
| Fe | 0-10 |
| Mn | 0-5 |
| Cu | 0-5 |
| B | 0-5 |
| Mo | 0-2 |
| Zn | 0-5 |
| Co | 0-1 |

Importantly, the elements from the secondary nutrients and micro nutrients do not necessarily have to be included in chelated form, such as EDTA or DTPA chelates or the like, but can rather be added as simple metal salts, especially nitrates or sulfates. Boron may be included as boric acid or as borate. Molybdenum may be provided as an alkali metal or ammonium molybdate. Magnesium can be present as magnesium nitrate.

Non-chelated secondary nutrients and micro nutrients include: calcium nitrate, magnesium nitrate, magnesium sulfate, ammonium sulfate, potassium sulfate, ferrous sulfate, ferrous nitrate, ferrous chloride, manganese sulfate, manganese nitrate, manganese chloride, copper sulfate, copper nitrate, copper chloride, boric acid, sodium borate, zinc sulfate, zinc nitrate, zinc chloride, sodium molybdate, ammonium molybdate and the like.

Of course, although not necessary, chelated metal salts such as Ca-EDTA, Mg-EDTA, iron-EDTA, iron-DTPA, iron-EDDHA, Mn-EDTA, Zn-EDTA, Co-EDTA, and copper-EDTA may be used as secondary nutrients and micro nutrients. In addition, the fertilizer composition of the present invention can contain additional materials such as cofactors, if desired.

The above nutrients are generally mixed as solids. The resulting products are dry solids as defined above. They should be stored in a water resistant packaging to minimize caking or lumping. Also, other soluble inerts (dyes, anti-caking agents, etc.) may be added to these fertilizer compositions. In some embodiments, the above nutrients may be mixed only upon addition to solution or immediately prior to addition to solution from a package, bag, or other container comprising the nutrients in at least two separate compartments.

The solid fertilizer compositions of the present invention are made up into stock solutions and finally into feed solutions by dissolving in water. This should be carried out in clean equipment usually with some agitation and/or stirring. Commonly, the concentration of the fertilizer composition in the stock solution is from about 5% to about 40% by weight of the solution, more preferably from about 10 to 25% by weight of the solution. This stock solution material is diluted by a factor of from about 10 to 800 for application to the plants which gives the final feed concentrations. Preferably, the concentration of the fertilizer composition in the feed solution is from about 0.05% to about 1% by weight of the solution, more preferably from about 0.1 to about 0.15% by weight of the solution.

Accordingly, in one or more embodiments of the present invention, a process for the rapid preparation of stock solution is described. Rapid preparation is defined as the creation of stock solution from a dry WSF composition according to the present invention and an aqueous additive such as water, tap water, well water, rain water, or other water types from any water source which provides, when 100 to 250 grams of WSF are dissolved per 1 liter room temperature of water, a substantially dissolved solution within about 30 minutes. An enhanced process provides dissolution within 30 to 60 minutes and an improved process provides dissolution in under 2 hours. Substantially dissolution is indicated, for example, by the appearance of a clear solution.

A process for preparation of stock solution is also described wherein solubility of WSF compositions is improved in water when the WSF composition is adapted to produce an exothermic reaction upon reaction of one or more acidic compounds and one or more basic compounds. In a preferred version of this process, the acidic compounds and basic compounds are present in non-trivial amounts. In a highly preferred embodiment, the acidic and basic compounds are present in such ratios as to yield a neutral fertilizer composition. For example, in some cases an equimolar ratio of the acidic component to the basic component may be used to produce an neutral solution upon dissolution of both in water. In other cases, the molar ratios of the acidic and basic components may not be equimolar. Formulation of compositions comprising acids and bases to produce neutral solutions upon dissolution in water is well within the skill of the art. See, e.g., Mattock, G. (1961). *PH measurement and titration*. Physical processes in the chemical industry, v. 6. New York: Macmillan. See also, e.g., Petrucci, R. H., Harwood, W. S., & Herring, F. G. (2002) *General chemistry: Principles and modern applications*. Upper Saddle River, N.J.: Prentice Hall.

Further, the compositions of one or more embodiments of the present invention comprise 5% or more of at least one acidic component and 5% or more of at least one basic component by weight of the total composition such that 10% or more of the composition comprises acidic and basic components.

In the above processes, a stock solution may be created by combination of a WSF according to the present invention and water. The mixture may optionally be stirred, agitated, or subjected to heat, ultrasound, or other radiation to further improve solubility.

A composition is stable, unless otherwise defined, when the composition does not exhibit substantial caking, decomposition, or "browning" (or other discoloration) during storage under typical ambient conditions after 7 days or at 54° C. in 3 days. "Storage", unless otherwise defined, is considered storage in substantially water impervious containers. Substantial caking is indicated when approximately 75 grams of the material in a bag presents palpable lumps and/or the material has lost the original flowability of the composition. A composition comprises mixed fertilizer components unless otherwise noted.

In an alternate embodiment of the present invention, one or more ingredients of the WSF composition are provided in a package or other container optionally comprising one or more compartments. In one or more additional compartments or additional packages or containers, the remaining ingredients of the WSF composition are provided. The process then comprises pouring or delivering the contents of the one or more packages, containers, or compartments to a vessel or other container or package. The vessel, container, or package may already comprise water or water may be added later in said vessel, container, or package, or in a second vessel, container, or package. Accordingly, WSF compositions of the present invention may include highly reactive fertilizer components which are separated by packaging or other materials until immediately or shortly prior to mixing either alone or with water. Therefore the advantages of improved solubility can be realized for compositions which may not be stable as dry mixtures. The manner of addition or mixing of the separated components may be adapted to account for the reactivity profile of the components.

An improved process for the delivery of nutrients to plants is also described. It may comprise the process of preparing a stock solution as described above using WSF according to the present invention followed by delivery of the stock solution to plants using, for example, proportioners, sprayers, drip lines, or other devices. Advantageously, this process results in the ability to rapidly deliver stock solution from the time of mixing to plants with minimization of precipitation of nutrients in the delivery apparatus.

The fertilizer composition of the present invention will be further described and advantages thereof will be made apparent with reference to the following Examples which are provided to illustrate the practice of the invention and not to limit its scope of the invention as defined by the appended Claims. All percentages are by weight unless otherwise indicated.

The following powders/granule mixtures in Table 4 have been made on lab scales (~50-100 grams) by thoroughly mixing technical grade ingredients. Nutrient analysis is based on $N:P_2O_5:K_2O$ content.

TABLE 4

| COMPOSITION AND NUTRIENT ANALYSIS | COMPONENT | % (W/W) | PH** | $S_M$*** |
|---|---|---|---|---|
| NEUTRAL COMPOSITION A (20:20:20) | Urea | 22.41 | 4.8 | >30 |
|  | MAP | 33.33 |  |  |
|  | $KNO_3$ | 44.26 |  |  |
| NEUTRAL COMPOSITION B (19:20:20) | UP | 11.35 | 6.4 | >30 |
|  | TKPP | 36.94 |  |  |
|  | AN | 51.72 |  |  |
| NEUTRAL COMPOSITION C (19:19:19) | AN | 46.95 | — | — |
|  | UP | 16.20 |  |  |
|  | DKP | 32.86 |  |  |
|  | KOH* | 3.29 |  |  |
| NEUTRAL COMPOSITION D | Urea | 40.21 | — | — |
|  | UP | 19.05 |  |  |
|  | DKP | 37.05 |  |  |
|  | KOH* | 3.70 |  |  |
| NEUTRAL COMPOSITION E | Urea | 21.97% | 4.8 |  |
|  | MAP | 32.68% |  |  |

TABLE 4-continued

| COMPOSITION AND NUTRIENT ANALYSIS | COMPONENT | % (W/W) | PH** | $S_M$*** |
|---|---|---|---|---|
| (20:20:20) + TE | $KNO_3$ | 43.39% |  |  |
|  | Trace elements (TE) | 1.96% |  |  |
| NEUTRAL COMPOSITION F (19:19:19) + TE | AN | 50.70% | 6.5 |  |
|  | UP | 11.13% |  |  |
|  | TKPP | 36.21% |  |  |
|  | Trace elements | 1.96% |  |  |
| WEAKLY ACIDIC COMPOSITION G (9:40:25) + TE | AN | 1.34% | 3.7 | 21 |
|  | UP | 48.79% |  |  |
|  | TKPP | 46.92% |  |  |
|  | Trace elements | 2.95% |  |  |

*KOH pellets ground using mortar and pestle
**pH of 50 grams in 500 mL water at room temperature (rt)
***Maximum solubility in water at 25° C. (grams per 100 mL $H_2O$)

EXAMPLE 1

Dissolution Speed—500 mL of deionized water was placed in a 1000 mL beaker glass. A magnetic stirring bar was added and the water was stirred at 600 RPM. The conductivity of the water was measured with a conductivity measuring device connected to a data collection system. Furthermore, a temperature probe (PT100) was placed in the water to measure the temperature continuously. At t=0 seconds, 50 grams of WSF was added and the conductivity and temperature were measured continuously.

In FIG. 1, the measured conductivity and temperature are given for both compositions as a function of the time. The conductivity is an indication of the amount of nutrients and thus WSF dissolved over time. The maximum $E_c$ measurement is set to 100% $E_c$. For Composition A (20+20+20) this is 50.1 mS/cm. For composition B (19+20+20) this is 69.3 mS/cm. To reach 80% Ec value it took 9 minutes and 42 seconds for the 20+20+20 formulation (Composition A, the reference product) and 3 minutes and 34 seconds for the 19+20+20 formulation (Composition B). Advantageously, the solubility speed is more than doubled in this case by the invention.

Without limiting the mechanisms by which the invention is construed to work or alternate mechanisms, the increased solubility can, at least in part, be explained by the differences in solubility of the compounds used. Another mechanistic explanation is that the 19+20+20 formulation which contains a solid acid and base did not reduce the temperature of solution as much as for the 20+20+20 formulation because of the resulting heat of neutralization.

EXAMPLE 2

Storage Stability Tests—Compositions A, B, C, and D were tested for stability according to the following method. Approximately 75 grams of a composition was weighed in a polyethylene sample bag. The sample bag was stored in a stove set at 40° C. under an iron block weighing about 10 kg on a wooden board of a dimension of 15 by 15 cm. After one day, the WSF product was checked on caking and other visual aspects.

Results after one day storage: The product according to one embodiment of the present invention (composition B) 19+20+20 indicated no caking and no visual change of the product. Also, composition A, the reference product, indicated no caking and visual change. Both composition C and D indicated caking and some "hot" spots, i.e. discolorations or visual appearance changes from the original composition. A hot spot was marked by the visualization of dark brown spots indicative of decomposition. The stability tests on compositions C and D demonstrate that the use of a strong base (like KOHL is preferably avoided.

Compositions E, F, and G illustrate alternative formulations of one or more embodiments of the present invention It is noted that Composition G demonstrates that WSF compositions having advantageous properties may be formulated having a pH in solution that is non-neutral.

Although the invention has been described in its preferred forms with a certain degree of particularity, it is to be understood that the present disclosure has been made by way of example only. Numerous changes in the details of the compositions and in the operational steps of the methods and in the materials utilized therein will be apparent without deporting from the spirit and scope of the invention, as defined in the appended Claims.

We claim:

1. A dry, solid fertilizer composition, comprising:
   (i) at least one acid (A) fertilizer which is solid at ambient temperature, wherein said acid has a pH of <4.5 in a 1% aqueous solution (w/w) at room temperature; and
   (ii) at least one weakly basic fertilizer component (wB) which is solid at ambient temperature, wherein said weakly basic fertilizer component has a pH in the range of >10 but <12.5 in a 1% aqueous solution (w/w) at room temperature; wherein
   (a) the total of all acids in the composition is at least 5% by weight of the composition; and
   (b) the total of all bases in the composition is at least 10% by weight of the composition.

2. The composition of claim 1, further comprising at least one neutral fertilizer component (C).

3. The composition of claim 2, wherein said at least one neutral fertilizer component is monoammonium phosphate, monopotassium phosphate, ammonium sulfate, magnesium nitrate, potassium chloride, calcium ammonium nitrate, ammonium nitrate, urea, potassium nitrate, potassium sulfate, or dipotassium phosphate.

4. The composition of claim 1, wherein said at least one acid is urea phosphate, and/or peKacid ($KH_5(PO_4)_2$).

5. The composition of claim 1, wherein said at least one weakly basic component is an alkali metal salt or an alkaline earth metal salt.

6. The composition of claim 5, wherein said at least one weakly basic component is tripotassium phosphate or tetrapotassium pyrophosphate.

7. The composition of claim 2, wherein said composition comprises (i) urea, MAP, and $KNO_3$; or (ii) AN.

8. A fertilizer stock solution, comprising the composition of claim 1 dissolved in water, wherein the concentration of said composition in the solution is between 5% and 40% by weight.

9. A method for making a fertilizer stock solution, comprising mixing water with the composition according to claim 1 at a concentration of between 5% and 40%.

10. A method for making the composition of claim 1, comprising the step of mixing one or more components of the composition of claim 1 in dry form.

11. A bagged, dry fertilizer product, comprising the composition of claim 1.

12. A method for delivering nutrients in solution to plants, comprising the steps of:
   (i) mixing water with the composition according to claim 1 to produce a substantially precipitate-free, substantially non-effervescent solution;
   (ii) optionally diluting said solution; and
   (iii) delivering said solution to one or more plants.

13. A dry, solid fertilizer composition, comprising:
   (i) at least one basic fertilizer component (B) which is solid at ambient temperature wherein said basic fertilizer component has a pH of >10 in a 1% aqueous solution (w/w) at room temperature;
   (ii) at least one weak acid (wA) fertilizer which is solid at ambient temperature, wherein said weak acid has a pH in the range of 3.0-<4.5 in a 1% aqueous solution (w/w) at room temperature; and
   wherein
   (a) the total of all weak acids in the composition is at least 5% by weight of the composition;
   (b) the total of all bases in the composition is at least 10% by weight of the composition; and
   (c) said composition is substantially non-effervescent upon dispersion in water at room temperature.

14. The composition of claim 13, further comprising at least one neutral fertilizer component (C).

15. The composition of claim 14, wherein said at least one neutral fertilizer component is monoammonium phosphate, monopotassium phosphate, ammonium sulfate, magnesium nitrate, potassium chloride, calcium ammonium nitrate, ammonium nitrate, urea, potassium nitrate, potassium sulfate, or dipotassium phosphate.

16. The composition of claim 13, wherein said at least one basic fertilizer component is an alkali metal salt or an alkaline earth metal salt.

17. The composition of claim 16, wherein said at least one basic fertilizer component is tripotassium phosphate or tetrapotassium pyrophosphate.

18. The composition of claim 14, wherein said composition comprises (i) urea, MAP, and $KNO_3$; or (ii) AN.

19. A fertilizer stock solution, comprising the composition of claim 13 dissolved in water, wherein the concentration of said composition in the solution is between 5% and 40% by weight.

20. A process for making a fertilizer stock solution, comprising mixing water with the composition according to claim 13 at a concentration of between 5% and 40%.

21. A process for making the composition of claim 13, comprising the step of mixing one or more components of the composition in dry form.

22. A bagged, dry fertilizer product, comprising the composition of claim 13.

23. A process for the delivery of nutrients in solution to plants, comprising the steps of:
   (i) mixing water with the composition according to claim 13 to produce a substantially precipitate-free, substantially non-effervescent solution;
   (ii) optionally diluting said solution; and
   (iii) delivering said solution to one or more plants.

24. The composition of claim 1, wherein the total of all acids in the composition is at least 10% to 40% by weight of the composition.

25. The composition of claim 1, wherein the total of all weakly basic fertilizer components in the composition is at least 15% to 40% by weight of the composition.

26. The composition of claim 13, wherein the total of all weak acids in the composition is at least 10% to 40% by weight of the composition.

27. The composition of claim 1, wherein the total of all bases in the composition is at least 15% to 40% by weight of the composition.

28. The composition of claim 1, wherein the composition is stable in dry form.

29. The composition of claim 1, wherein the composition is substantially non-effervescent upon dispersion in water at room temperature.

\* \* \* \* \*

UNITED STATES PATENT AND TRADEMARK OFFICE
CERTIFICATE OF CORRECTION

PATENT NO. : 8,419,820 B2
APPLICATION NO. : 12/361188
DATED : April 16, 2013
INVENTOR(S) : Hein Herman Vriesema et al.

It is certified that error appears in the above-identified patent and that said Letters Patent is hereby corrected as shown below:

In the Specification

In Column 5, line 58, Table 1 should read: pH RANGE for Neutral = "$\geq 4.5$ but $<10$"

In Column 5, line 63, Table 1 should read: pH RANGE for Neutral = "$\geq 4.5$ but $<10$"

See Table 1 Below.

TABLE 1

| | pH RANGE |
|---|---|
| FERTILIZER COMPOSITION | |
| Acidic | $<4.5$ |
| Weakly Acidic | $3.0 - <4.5$ |
| Neutral | $\geq 4.5$ but $<10$ |
| Weakly Basic | $>10$ but $<12.5$ |
| Basic | $>10$ |
| COMPONENT | |
| Acidic | $<4.5$ |
| Weakly Acidic | $3.0 - <4.5$ |
| Neutral | $\geq 4.5$ but $<10$ |
| Weakly Basic | $>10$ but $<12.5$ |
| Basic | $>10$ |

Signed and Sealed this
Twentieth Day of August, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,419,820 B2 | Page 1 of 1 |
| APPLICATION NO. | : 12/361188 | |
| DATED | : April 16, 2013 | |
| INVENTOR(S) | : Vriesema et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this
Fourth Day of November, 2014

Michelle K. Lee
*Deputy Director of the United States Patent and Trademark Office*